United States Patent [19]

Menon et al.

[11] Patent Number: 4,716,467

[45] Date of Patent: Dec. 29, 1987

[54] SPEED-UP METHOD AND APPARATUS FOR TWO-DIMENSIONAL FACSIMILE CODING AND DECODING

[75] Inventors: Vinod Menon, Sunnyvale; Shinkyo Kaku, Los Gatos, both of Calif.

[73] Assignee: Advanced Micro Devices, Inc., Sunnyvale, Calif.

[21] Appl. No.: 706,201

[22] Filed: Feb. 27, 1985

[51] Int. Cl.⁴ ............................................. H04N 1/41
[52] U.S. Cl. ..................................... 358/260; 358/288
[58] Field of Search ................. 358/257, 260, 261, 288

[56] References Cited

U.S. PATENT DOCUMENTS

| | | | |
|---|---|---|---|
| 4,301,479 | 11/1981 | Fukinuki | 358/257 |
| 4,353,095 | 10/1982 | Tatematsu | 358/288 |
| 4,366,505 | 12/1982 | Tsuda | 358/288 |
| 4,413,287 | 11/1983 | Torpie | 358/288 |
| 4,543,611 | 9/1985 | Kurahayashi | 358/288 |

Primary Examiner—Michael A. Masinick
Attorney, Agent, or Firm—Patrick T. King; Kenneth Salomon; J. Vincent Tortolano

[57] ABSTRACT

A method and device for speeding the transmission and reception of documents by digital facsimile systems employing two-dimensional coding. Information regarding a reference line of a document need not be reaccessed from memory during the processing of the scan line next-following a uni-color reference line. A user-accessible paper-width register utilized in conjunction with a comparator according to the speed-up method permits ready detection of uni-color lines and permits encoding and decoding according to either of two international standards. Utilization of the paper-width register affords ready availability of the accumulated run-length of picture elements within uni-color lines without the need to accumulate the run length or reaccess the uni-color reference line.

10 Claims, 5 Drawing Figures

SPEED-UP METHOD AND APPARATUS FOR TWO-DIMENSIONAL FACSIMILE CODING AND DECODING

CROSS REFERENCE TO RELATED PATENTS

Related patents of particular interest to this invention are U.S. Pat. No. 4,562,484 to Krishna Rallapalli and Shinkyo Kaku entitled "A Method and Device for Decoding Two-Dimensional Facsimile Signals", assigned to the assignee of the instant and application U.S. Pat. No. 4,558,371 Krishna Rallapalli and Shinkyo Kaku entitled "Method and Device for Two-Dimensional Facsimile Coding", assigned to the assignee of the instant application.

FIELD OF THE INVENTION

This invention relates to transmission and reception of documents by digital facsimile systems and, more particularly, to methods and apparatus for speeding the two-dimensional encoding and decoding of picture elements by eliminating the need to recall from memory uni-color reference lines and by using a user-accessible paper-width register.

BACKGROUND OF THE INVENTION

Facsimile apparatus is used for the digital electrical transmission of documents over long distances. Typically, a document is scanned line-by-line to generate a digitized representation of each scanned line of the document. Each bit of information, either a ZERO or ONE corresponds to a small area of the document. The color of the area, i.e., whether it is predominantly white or black, determines whether the associated binary signal is a ZERO or a ONE, respectively.

Transmitting a binary signal for each small area of the document requires a large amount of digital information and transmitting one 8½ by 11 inch page can take as long as fifteen minutes. Therefore a variety of techniques have been proposed to reduce the amount of information used to represent a scanned line of a document. For a general explanation of such techniques, see the article "International Digital Facsimile Coding Standards", by R. Hunter and A. H. Robinson in the Proceedings of the Institute of Electrical and Electronic Engineers, Volume 68, No. 7, July 1980, pages 854–867. This article describes, in particular, a modified two-dimensional relative element address designate (READ) coding procedure as defined in Recommendations T.4 (Group 3) and T.6 (Group 4) of the Commite Consultative International pour Telephonie et Telegraphie (CCITT). For a complete description of this coding procedure reference should be had to U.S. Pat. No. 4,562,484 "A Method and Device for Decoding Two-Dimensional Facsimile Signals", assigned to the assignee of the instant application, and U.S. Pat. No. 4,558,371, entitled "Method and Device for Two-Dimensional Facsimile Coding", assigned to the assignee of the instant application; both patents hereby incorporated by reference.

Generally speaking, two-dimensional coding employs statistically-developed correlations of information in the vertical direction of documents to be transmitted. In this manner, commonly-occurring inter-line patterns can be encoded in a way which significantly reduces the amount of information used to represent a scanned line of the document. Information regarding a reference line, which has already been processed, is used to code the information on a subsequent scanned line, called the coding line.

The previously-mentioned patents disclose methods and devices for performing such two-dimensionl coding and decoding which offer many advantages over the prior art. However, as those methods and devices require that the information regarding the reference line be reaccessed from a so-called "picture memory" during the encoding of the coding line, in order to compare their differences, the coding and decoding process is slowed considerably due to the resulting doubling of information which must be transferred on the bus from the picture memory.

Another aspect of the methods and devices described in the co-pending applications, mentioned above, is their reliance on so-called "end-of-line" codes to signify the end of transmission or reception of a line. Such codes contain no inherent document-specific information, and simply represent an appreciable overhead cost added to each line of the document.

Yet another aspect of the methods and devices described in the co-pending applications, is their calculation of accumulated run-lengths during the processing of so-called "uni-color" line, i.e., those which are encoded as all ONE's or all ZERO's. This calculation imposes an overhead cost during the processing of what are otherwise very easily encoded or decoded scanned lines. Since statistics reveal that a considerable portion of scan lines in ordinary documents do not have color changes in them, for example, a simple business letter can be expected to contain 60% all white scan lines, any of the three overhead costs mentioned in connection with the processing of lines by the prior art represent substantial slow downs in the processing of documents by fascimile apparatus.

SUMMARY OF THE INVENTION

The present invention provides improved two-dimensional compression or expansion of picture data to be transmitted over facsimile apparatus by "remembering" that the previously-scanned line of a document, the reference line, was uni-color, either all black or all white, by storing two values selected from ONE or ZERO, respectively, in an internal two-bit control register. The contents of both positions of the register being set to ONE if there was a color change during the scan of the line and if there were no such color change the first bit position reflecting the color of all picture elements of the scan line. Thus both the fact that the previously-scanned line was uni-color and that its color is either all black or all white is readily determined by reference to the contents of this internal register without the need to reaccess the reference line from picture memory.

For a typical business letter, with a white scan line ratio of 60%, the method and apparatus of the instant invention reduces the accesses on the bus to the picture memory by 30%, and results in improved coding and decoding rates. Even for dense text, in which white scan lines of about 25% can be expected, at least a 10% reduction in picture memory accesses is achieved, over the prior art.

In another aspect of the instant invention, the user is able to specify as a coding parameter the paper width, and the accumulated run length of a color within the scanned line is then compared against the paper width value stored in a register. If the two values are equal, the current line is known to be uni-color. This user-supplied parameter results in a device which can be selectably operated in a manner compatible with either the Group 3 or the Group 4 CCITT two-dimensional Recommendations T.4 or T.6.

Additionally, as the presently-encoded line is then known to be uni-color, its run length will be equal to the contents of the paper width register, which can therefore be used to specify the run-length rather than having to accumulate the run length or reaccessing the reference line, as in the prior art.

A facsimile device employing the methods and apparatus according to the instant invention will encode or decode and transmit documents at a significantly faster rate than in the prior art. This is as a result of the prevalance of all-white scan lines in typical business letters which are readily coded without the overhead imposed by having to reaccess the reference line.

DESCRIPTION OF THE PREFERRED EMBODIMENT

A method and device which expands the received encoded scanned-line data by the modified two-dimensional relative element address designate (READ) code contained in the CCITT T.4 Recommendation into the run lengths of the color units in the coding line subsequently generates picture elements therefrom is described in the related U.S. Pat. No. 4,562,484 entitled "A Method and Device for Decoding Two-Dimensional Facsimile Signals" assigned to the assignee of the instant application, and is hereby incorporated by reference in the instant application. Except insofar as will be described hereinafter regarding the methods and apparatus of an internal two-bit control register, a paper-width register, the direct loading of the run-length register from the paper-width register of the instant invention, and the use of a comparator, the detailed description of the facsimile decoding device supplied in the related co-pending application applies equally to the facsimile decoding device of the instant invention.

Figure 1:
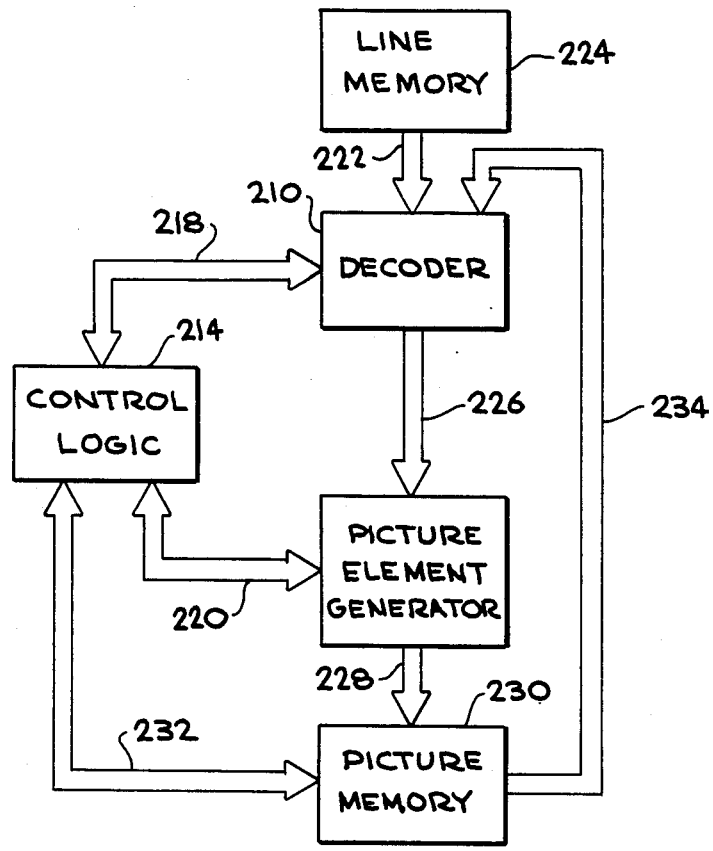
FIG. 1 is a block diagram of a facsimile decoding device employing speed-up methods according to the teachings of the instant invention.

FIG. 1 of the instant application illustrates a facsimile decoding device employing methods of the instant invention and is essentially equivalent to the portion of FIG. 1 of the related patent showing the decoder 210, the picture element (PELS) generator 212 and the control logic 214, and the detailed description therein applies equally to these elements of FIG. 1 of the instant application. Accordingly, the description of the operation of decoder 210, as contained in the related patent, given in connection with FIGS. 1 and 2A, 2B and 2C therein, is incorporated by reference herein.

Briefly, the timing and operation of the decoder 210 and the picture element generator 212 is controlled by the control logic unit 214 which communicates with the decoder via a control path 21B and with the picture element generator via a data path 220. The decoder 210 receives the encoded picture data on a data path 222 from a line memory 224. This data is in the form of ZEROs and ONEs which correspond to lines of a document which ha been scanned by a digital facsimile transmitter and encoded thereby.

The encoded data signals are accepted by the decoder 210 and transformed therein into run length data which indicate the color and run length of contiguous color units. The run length data is received by the picture element generator 212 via a data path 226. The generator 212 then forms the picture element data from the color and run length data. The resulting picture element data is placed onto a data path 228 leading to a picture memory 230 which connects to a terminal, printer or similar device for display of the received document. By line-by-line decoding, picture element generation, and display, a copy of the original document is formed and the facsimile operation performed. Reconstructed scan lines within the picture memory 230 can be accessed by the control logic 214 via a control path 232 and conveyed back to decoder 210 via a data path 234.

A detailed description of the operation and construction of the picture element generator 212 can be had by reference to co-pending application Ser. No. 524,957 filed Aug. 19, 1983 on behalf of Krishna Rallapalli and Shinkyo kaku entitled "Picture Element Generator for Facsimile Receiver" assigned to the assignee of the instant applications and hereby incorporated by reference.

THE SPEED-UP METHOD OF THE PRESENT INVENTION

An understanding of the modified READ (Relative Element Address Designate) coding procedure defined by the CCITT T.4 standards described in the IEEE article referred to above is useful in understanding the speed-up method and device of the present invention. A detailed description of the method, in general, and as implemented by the method and device of the related U.S. Pat. No. 4,562,484 "A Method and Device for Decoding Two-Dimensional Facsimile Signals", is contained therein in connection with FIGS. 2, 3 and 4, and except as will be described hereinafter, applies equally to the decoding method and device of the present invention and is hereby incorporated by reference.

Briefly, the decoding method as described in that co-pending application compares the currently decoded line received from the line memory 224 with the previous line contained within picture memory 230 and decodes only the differences between these lines. The decoding process is considerably slowed by the need to recall from picture memory 230 the black/white pattern of the previous line. In a typical document, many scan lines are uni-color (solid) lines and recalling such lines consumes much time without yielding any information other than the color of the line (all black or all white) and that the line is uni-color.

The instant invention called for setting the contents of a two-bit register so that during the processing of a scan line the relevant information as to whether a line is uni-color and the color of the line is readily available without the need to recall the entire black/white pattern of the line. In this manner, considerable improvement in coding speeds due to a 30% reduction in bus traffic on the picture memory can be expected.

With reference to Table I, below, the method of the present invention uses the two-bit register to store the status of the previous scan line, the "reference" line. If a color change is subsequently detected during the processing of the line, both the first and second bit positions in the register are set to ONE. If no color change occurs within the line, the first bit position is set to ONE and the second bit position is set to ZERO if the line was all white, or if it was all black the first bit position is set to ZERO and the second bit position is set to ONE. Table I, below, summarizes these possibilities in the reference line.

Setting the reference line status register during processing of the reference line is conventional. Accordingly, no further description of the method and apparatus used therein will be given as they would be apparent to those skilled in the art.

TABLE I

| Reference Line Status Register | | |
|---|---|---|
| Contents | | Meaning |
| 1 | 1 | There were color changes in the Reference Line |
| 1 | 0 | The Reference Line was all black |
| 0 | 1 | The Reference Line was all white |
| 0 | 0 | Impossible combination |

Before processing begins on a scan line, the two bit positions in the reference line status Register are tested. For the "11" combination, processing of the scan line proceeds as described in the related patent "A Method and Device for Decoding Two-Dimensional Facsimile Signals", which calls for accessing from memory the reference line for use in the two-dimensional decoding method described therein.

However, for the "10" and "01" combinations within the status register, the uni-color reference line need not be accessed and the decoding time improvements mentioned above can be realized since business correspondence contains a large percentage of sucn uni-color lines.

In another aspect of the decoding speed-up method according to the present invention, the user specifies as a decoding parameter, the paper width to be used in reconstructing the transmitted document. The method calls for comparing the accumulated run length of a color during the processing of a scan line against the paper width value stored in a register. If the two values are equal, the current line is known to be uni-color and the contents of the reference line status register can be set in accordance with Table I, above. Furthermore, the contents of the paper width register can then be directly loaded to an accumulated run-length register rather than accumulating the run-length, or reaccessing the reference line.

In a further aspect of the method of the prevent invention, use of the paper width parameter to determine the end of a picture line as an aid in detecting a uni-color line removes the need for the end-of-line (EOL) code and results in a method which is user-selectable between the Group 3 (each code line delimited by EOL code) or the Group 4 (no EOL code requirement) CCITT 2-D facsimile encoding/decoding recommendations T.4 or T.6, respectively.

The decoding method according to the instant invention will be described with reference to the unitary drawing FIG. 3, comprising parts FIG. 3A, FIG. 3B and FIG. 3C, of the related patent entitled "A Method and Device for Decoding Two-Dimensional Facsimile Signals", and the detailed description of the decoding method given therein in connection with FIG. 3 thereof applies equally to the decoding method of the instant invention, except as will be described hereinafter, and accordingly is incorporated by reference herein.

The description of the instant decoding method is best described in terms of the registers R1, R2, R3, P1, P2 and TR used in the description of the decoding method given in the related patent referred to in the preceding paragraph as well as in terms of a paper width (PW) register which is used to store the width of the paper to be used in reconstructing the transmitted document, and the contents of the reference line status (RLS) register. These values are loaded into the PW and RLS registers prior to, or during, the initialization step 101 shown on FIG. 3A of the related, patent.

Figure 2:
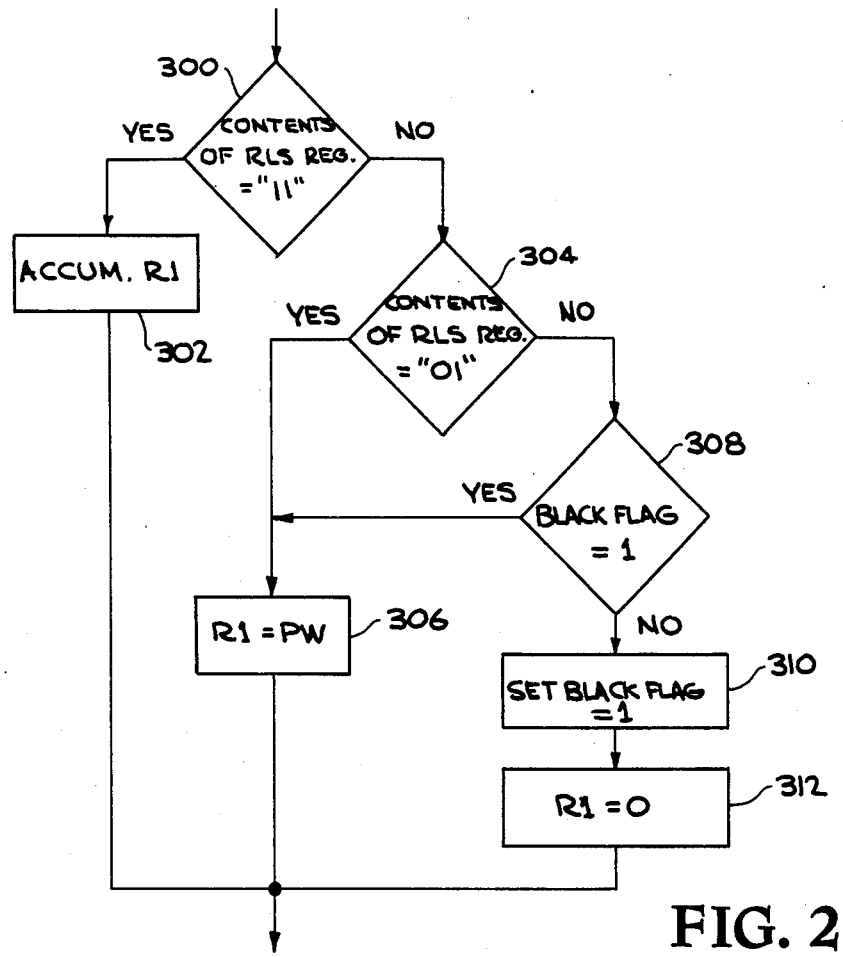
FIG. 2 is a flowchart describing one aspect of the speed-up method of the instant invention which supersedes that portion of the flowchart of FIG. 3A of the related patents shown as block 103 therein.
Figure 3:
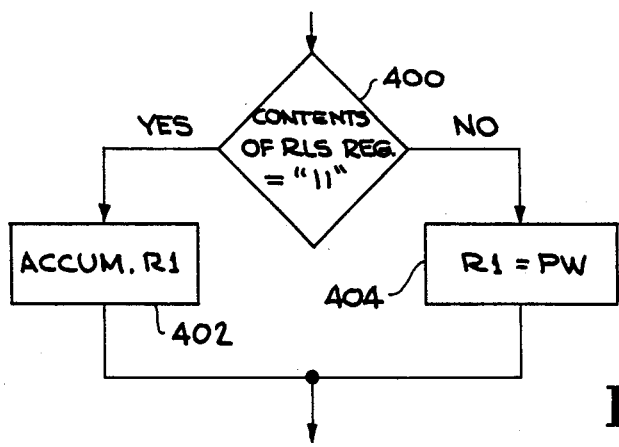
FIG. 3 is a flowchart describing another aspect of the speed-up method of the instant invention which supersedes those portions of the flowchart of FIGS. 3A and 3B of the patents shown as blocks 118, 122, and 124, therein.

Shown at a number of decoding steps on FIGS. 3A and 3B of the related patent is the sequence calling for storing the accumulated run length of the color unit immediately preceding the current color unit in the reference lines, shown thereon as "R2=R1" and accumulating the run length of the current color unit, shown thereon as "ACCUM. R1". Of interest to the method of the instant invention, these actions take place during "vertical" mode decoding at the pairs of steps 102 and 103, 117 and 118, 121 and 122, and 123 and 124, of the flowchart illustrated in FIGS. 3A and 3B. The speed-up method according to the instant invention calls for the improvement wherein step 103 of the first such pair 102 and 103 is replaced with the steps illustrated in FIG. 2 of the instant application and steps 118, 122 and 124 of the remaining such pairs 117 and 118, 121 and 122, and 123 and 124 are each replaced with the steps illustrated in FIG. 3 of the instant application. Steps in the flowchart illustrated in FIGS. 3A and 3B of the related patent which implement the "ACCUM. R1" action described above are to be undertaken only when the contents of the RLS register is a "11", in accordance with Table I, above, and, accordingly, the speed-up procedure called for by the method of the instant invention is unavailable because the reference line is not uni-color. Therefore the method detailed in the flowchart of FIG. 3 of the related patent is to be carried out without modification for the current scan line whenever the contents of the RLS register is a "11", as tested in decision diamond 300 and 400, and the "YES" exit therefrom is taken leading to block 302 and block 402, respectively, as shown in FIG. 2 and FIG. 3, respectively, which call for the "ACCUM.R1" action.

However, if the reference line is uni-color, the contents of the RLS register is either a "01" or a "10", in accordance with Table I, above. Depending on the outcome of the contents of the RLS register as tested in decision diamond 304 in the flowchart in FIG. 2, the speed-up method calls for setting R1 to the value in the PW register in block 306 when the reference line is all white and, accordingly, the "YES" exit from decision diamond 304 leading to block 306 is taken. If the reference line is all black, the "NO" exit from decision diamond 304 is taken which leads to a decision diamond 308 in which a BLACK FLAG is tested. The BLACK FLAG is initialized in block 101 shown in FIG. 3A of the related patent, to zero, in that each scan line, by convention, is assumed to begin with a white color unit. Therefore during the first pass through the flowchart of FIG. 2 following initialization, the "NO" exit from the decision diamond 308 will be taken leading to a block 310 which calls for setting the BLACK FLAG to one. The contents of R1 is then set to zero in a block 312, establishing a run length of zero for the white color unit with which the reference line is presumed to start. Thereupon, on furture passes through the flowchart of FIG. 2, for the all-black reference line the setting of BLACK FLAG to one will cause the "YES" exit from decision diamond 308 to bypass blocks 310 and 312 and R1 will be set, or remain at, the value in the PW register. The calculation of the Y displacement value called for by the decode step 104 in FIG. 3A of the related patent is dependent on the relative locations of color units in the reference line and the current scan line, and will accordingly be utilized in the calculation of the Y displacement at step 104 without the need to access uni-color reference lines and thus the decoding time of the current scan-line is reduced.

The flowchart of FIG. 2 illustrating these aspects of the speed-up method according to the instant invention is to replace the block 102, illustrated in FIG. 3A of the related patent. The flowchart of FIG. 3 of the instant application is to replace the blocks 118, 122 and 124, mentioned above, within the flowcharts of FIG. 3A or FIG. 3B of the related patent.

As shown in FIG. 3 of the instant application, a decision diamond 400 calls for testing the contents of the RLS register. In the event the reference line is not uni-color, the step shown in FIG. 3A or 3B of the related patent calling for accumulating the run length of the current color unit is to be undertaken as shown in block 402 of the flowchart of FIG. 3 of the instant application. However, if the reference line is uni-color, then the flowchart of FIG. 3 simply calls for setting R1 to the value in the PW register in block 404, thereby establishing the run length of the current length for the color unit in the reference line. In this manner, the uni-color reference line need not be accessed and decoding time improvements can be realized.

The speed-up method of the present invention calls for comparing the contents of the PW register with the accumulated run length (RL) of the color in the current scan line each time the value in the RL register is realized as an output signal to the PELS generator 212. Accordingly, each time the flowchart illustrated in FIGS. 3A, 3B and 3C of the related patent calls for implementing the "OUTPUT RL" action, block 500 of the flowchart of FIG. 4 of the instant application, plus the test shown in decision diamond 502 of FIG. 4 of the instant application should be performed as well.

Figure 4:
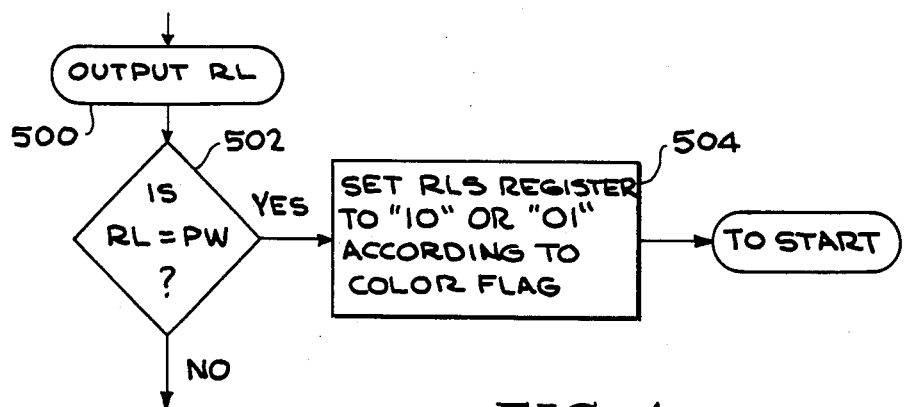
FIG. 4 is a flowchart describing yet another aspect of speed-up method of the instant invention which supersedes those portions of the flowchart of FIGS. 3A, 3B and 3C of the related patents shown as blocks 110, 131, 158 and 182 therein.

As illustrated in decision diamond 502 of the flowchart of FIG. 4, the contents of the RL and PW registers are compared and if they are equal, the current scan line is detected as uni-color and accordingly, following the "YES" exit from diamond 502, in block 504, the contents of the RLS register is set to either "10" or "01" according to whether the current scan line is all white or all black, as determined by the current value of the color flag. The exit from block 504 is connected to the START block (100 on flowchart of FIG. 3A of the related patent) so that processing of the next scan line will occur. The "NO" exit from decision diamond 502 leads to the portion of the flowchart illustrated in FIGS. 3A, 3B and 3C of the related patent which follows the "OUTPUT RL" action shown therein.

The flowchart of FIG. 4 of the instant application is therefore to replace all the steps within the flowchart of FIG. 3 of the related patent at which the OUTPUT RL action is called for; namely, steps 110, 131, 158 and 182.

Finally, the decoding method described in the related patent can be augmented by inclusion of a comparison, which, for each current scan line, compares the contents of the total accumulated run length of the coated portion in the coding line (TR) register against the constants of the PW register and detects thereby the end of a line (EOL) without the need for an EOL code.

THE DECODING DEVICE OF THE PRESENT INVENTION

Figure 5:
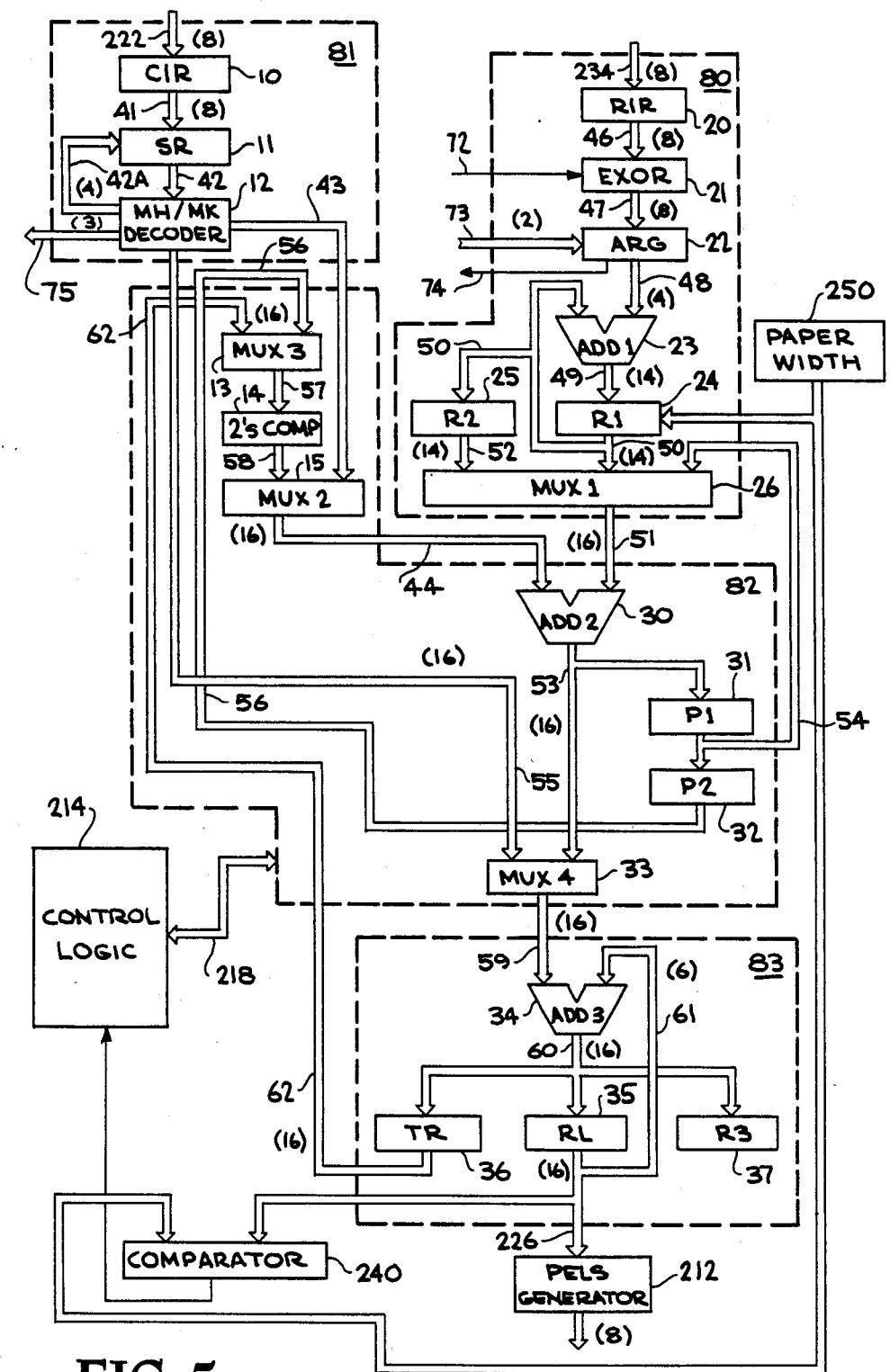
FIG. 5 illustrates the architecture of the decoding device of the instant invention.

FIG. 5 is a block diagram of a decoder 10 constructed according to the teachings of the instant invention. As mentioned above, except for an internal two-bit control register, a paper-width register, a comparator, and the direct loading of the accumulated run-length register from the paper-width register, the block diagram of decoder 210 as shown in FIG. 5 of the instant invention is identical in all other respects to the block diagram of the decoder as shown on FIG. 4 of the related U.S. Pat. No. 4,562,484 entitled "A Method and Device for Decoding Two-Dimensional Facsimile Signals". Accordingly, except a will be described hereinafter, the detailed description given of the decoder 210 in connection with the FIG. 4 therein applies equally to the decoder 210 of the present invention and is hereby incorporated by reference.

With reference to FIG. 5 of the instant application, the decoder 210 includes a reference line processing unit 80 which receives on data path 234 the reconstructed scan lines stored within the picture memory 230. This reference line data is received as 8-bit parallel data blocks by a reference line input register (RIR) 20. A coding line processing unit 81 portion of decoder 210 receives on data path 222 the current scan line from the line memory 224. This current scan line data is received as 8-bit parallel data blocks by a current line input register (CIR) 10.

A logic combining unit consists of a first part 82 connected to the reference line processing 80 and coding line processing 81 units, and a second part 83 connected to the first part logic combining unit 82. Via the bus 226, run-length (RL) register 35 of the second part logic combining unit 83 of decoder 210 is connected to the PELS generator 212 as well as to a comparator 240. A user-accessible paper width register 250 is connected to the accumulated run length register (R1) 24 portion of the reference line processing unit 80. The paper width register 250 is also connected to a second input of comparator 240. Output signals generated by the comparator 240 are conducted to the control logic 214. The control logic 214 includes the two-bit reference line status register described in connection with Table I, above. The particular logic circuits used to implement the two-bit reference line status register and its interconnection to other elements within control logic 214 are not shown since it is well known how to design and connect such circuits between registers and a control logic unit.

The control logic unit 214 communicates with the elements of decoder 210 through a control line symbolized in FIGS. 1 and 5 by a bidirectional arrow 218. Where a particular element is discussed in detail below, the individual control lines for that element are also explained. However, one skilled in the art may also deduce the nature and operation of the control lines not shown from the explanation in the related patent "A Method and Device for Decoding Two-Dimensional Facsimile Signals", mentioned above.

The user-accessible paper width register 250 of decoder 210 of the present invention is capable of storing a decoding parameter indicative of the paper-width to be used in reconstructing the document transmitted to the facsimile device containing the decoder 210. Comparator 240 generates a signal communicated to control logic unit 214 indicating whether the contents of the pper width register 250 is equal to the contents of the run-length (RL) register 35.

In accordance with the present invention, before each current scan line is to be processed, the contents of the two-bit reference line status regiter within control logic unit 214 are tested. For the "11" combination, described in connection with Table I, above, processing of scan lines by the decoder 210 proceeds as described in the related patent "A Method and Device for Decoding Two-Dimensional Facsimile Signals", and control logic 214 generates signals as described therein to cause the reference line to be accessed from the picture memory 230 and conducted to the reference line processing unit 80 for use during the processing of the current scan line.

However, if the contents of the reference line status register is either "10" or "01", then the reference line is uni-color and need not be accessed. In these cases, the control logic unit 214 generates signals which cause the contents of the paper width register 250 to be transferred to the accumulated run-length register (R1) 24 where it is combined with the decoded Y displacement value, as described in the related patent referred to in the preceding paragraph.

The color of the uni-color reference line is deduced from the contents of the reference line status register being either "10", indicative of all black, or "01", indicative of all white, in accordance with Table I, above. Accordingly, the contents of the reference line status register can be used by control logic unit 214 to set the color flag at the beginning of the processing of the current scan line. The use of the color flag in processing the current scan line is described fully in the related, co-pending application referred to in the preceding paragraphs.

In any event, regardless of the nature of the reference line, during the processing of the current scan, the control logic unit 214 receives on signal lines 218 information regarding a color change within the current scan line, and whether the first bit of the scan line is black or white. In this way, the contents of the reference line status register within control logic 214 can be established following completion of the processing of the current scan line by decoder 210.

Detection of completion of the processing of a uni-color current scan line is facilitated by decoder 210 of the instant invention by the presence of comparator 240 which removes the need to calculate the accumulated run-lengths used within the decoder described in the related, co-pending application referred to in the preceding paragraphs. Comparator 240 generates a signal received by control logic unit 214 whenever the contents of the run-length (RL) register 35 equals the user-supplied contents of the paper-width register 250. If these two values are equal, the current scn line is uni-color and the contents of the reference line status register is accordingly established as shown in Table I, above as either "10" or "01". Alternatively, if at the end of processing the current scan line, control logic unit 214 does not receive from comparator 240 the signal just described, then the current line is not uni-color and the contents of the reference line status register is established as "11", in accordance with Table I, above.

While the speed-up method and apparatus of the instant invention has been described in connection with the decoding method and apparatus of the related patents "A Method and Device for Decoding Two-Dimensional Facsimile Signals", mentioned above, the speed-up method of the instant invention applies equally to the coding method and apparatus of the related patent "Method and Device for Two-Dimensional Facsimile Coding", mentioned above, as would be apparent to those skilled in the art. Accordingly, the appended claims are directed to an encoding/decoding speed-up method and to encoding apparatus and to decoding apparatus employing the speed-up method of the instant invention.

We claim:

1. In a facsimile system for digitized picture elements of units of alternating color employing a method for encoding/decoding a scan line of said digitized picture elements with respect to a reference line of said digitized picture elements, a method for improving said encoding/decoding speed comprising the steps of:
   (a) detecting a uni-color scan line during said encoding/decoding of said scan line and recording the color of said picture elements in said uni-color scan line; and
   (b) encoding or decoding a line next-following said uni-color line detected in step (a) with respect to a reference line comprising a uni-color line having all its digitized picture elements of said color recorded in step (a), and without reference to said uni-color line detected in step (a).

2. The encoding/decoding speed-up method according to claim 1 wherein said facsimile system can operate on a plurality of selectable line-widths and where said uni-color detection step (a) further calls for comparing the accumulated run lengths of said scan line color units for equality with said selected line-width, whereby said scan line is determined to be uni-color when said comparison indicates equality.

3. The encoding/decoding speed-up method according to claim 1 wherein said facsimile system can be operated in a plurality of selectable line-widths and wherein said uni-color detection step (a) further calls for comparing the accumulated run lengths of said scan line color units for equality with said selected line-width whereby an end-of-coding-line indication is given when said comparison indicates equality.

4. In a facsimile system for digitized picture elements of units of alternating color employing a method for encoding/decoding a scan line of said digitized picture elements with respect to a reference line of said digitized picture element, a method which selectably operates on scan lines which include an end-of-line code or on scan lines which do not include said end-of-line code wherein when said system is operated on scan lines not including said end-of-line code, the end of each said scan line is detected by comparing the accumulated run lengths of said scan line color-units for equality with said selected line-width, whereby an end-of-coding line indication is given when said comparison indicates equality.

5. A facsimile device operable on a plurality of selectable scan line widths for decoding the positions of color change picture elements in a coding line of digitized picture data coded in a sequence of codewords with respect to the position of change picture elements in a reference line of digitized picture data, said device comprising:

a control logic for controlling the operations of said device;

first means, coupled to said control logic and responsive to said reference line picture data, for sequentially generating in parallel the accumulated run lengths of each color change picture element in said reference line;

second means, coupled to said control logic and responsive to said control logic and responsive to said codewords, for generating displacement values;

third means, coupled to said control logic, first and second means, for combining said reference line accumulated run lengths and said displacement values to sequentially generate the accumulated run lengths of change picture elements in said coding line; and fourth means, coupled to said control logic and said third means, for generating the difference in accumulated run lengths for consecutive color change picture elements in said coding line to generate the run lengths of color units between said consecutive color change picture elements;

whereby said generated run lengths are decoded from said codeword sequence;

register means coupled to said first means for storing a user-selectable parameter indicative of said selectable scan line width, wherein said control logic selects said coded run lengths for encoding positions of change picture elements in said coding line without reference to said reference line picture data under predetermined conditions.

6. A facsimile decoding device according to claim 5 further including comparator means coupled to said register means and responsive to said generated run length for generating a signal indicative of a uni-color coding line when said contents of said register means is equal to said generated run length.

7. A facsimile decoding device according to claim 6 wherein said control logic is responsive to said equality signal generated by said comparator means, whereby said control logic selects said coded run lengths based on said predetermined conditions being a state indicative of the presence of said uni-color coding line and the color thereof.

8. A facsimile device operable in a plurality of selectable scan line widths for encoding the positions of change picture elements in a coding line of digitized picture data, with respect to the positions of change picture elements in a reference line of digitized picture data, said device comprising:

a control logic for controlling the operations of said device;

means, coupled to said control logic and responsive to said coding line and reference line picture data for sequentially generating in parallel the accumulated run lengths of each change picture element in said coding line and reference line;

means, responsive to said sequential generating means for determining the difference in accumulated run lengths of said coding line picture element and a reference line change picture element;

means, coupled to said control logic and responsive to said determining means for coding said difference in accordance with said predetermined code; and register means coupled to said sequential generating means for storing a user-selectable parameter indicative of said selectable scan line width;

whereby said control logic, responsive to said difference, selectively advances said generating means for the accumulated run length of the next coding line change picture element and the next reference line change picture element and enables said encoding means in accordance with first predetermined conditions upon said difference, wherein said control logic, further responsive to the contents of said register means, causes said selective advancement of said generating means and said enablement of said encoding means without reference to said reference line under second predetermined conditions.

9. A facsimile encoding device according to claim 8 further including comparator means coupled to said register means and responsive to said accumulated run length of said next coding line picture element for generating a signal indicative of a uni-color coding line when said contents of said register means is equal to said accumulated run length.

10. A facsimile encoding device according to claim 9 wherein said control logic is responsive to said equality signal generated by said comparator means, whereby said control logic causes said selective advancement of said generating means and said enablement of said enabling means based on predetermined conditions being a state indicative of the presence of said uni-color coding line and the color thereof.

* * * * *